(12) United States Patent
Tabata et al.

(10) Patent No.: US 7,762,068 B2
(45) Date of Patent: Jul. 27, 2010

(54) CONTROL APPARATUS FOR INTERNAL COMBUSTION ENGINE WITH SUPERCHARGER

(75) Inventors: Masakazu Tabata, Susono (JP); Osamu Igarashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/302,934

(22) PCT Filed: Aug. 3, 2007

(86) PCT No.: PCT/JP2007/065253

§ 371 (c)(1),
(2), (4) Date: Dec. 1, 2008

(87) PCT Pub. No.: WO2008/018380

PCT Pub. Date: Feb. 14, 2008

(65) Prior Publication Data

US 2009/0198432 A1 Aug. 6, 2009

(30) Foreign Application Priority Data

Aug. 10, 2006 (JP) ............................ 2006-218810
Aug. 10, 2006 (JP) ............................ 2006-218811

(51) Int. Cl.
*F02B 33/44* (2006.01)
(52) U.S. Cl. ........................................ 60/608; 701/104
(58) Field of Classification Search ........... 60/606–609; 701/104
See application file for complete search history.

(56) References Cited

U.S. PATENT DOCUMENTS

| 5,159,913 A | * | 11/1992 | Furuya | 123/493 |
| 6,298,718 B1 | * | 10/2001 | Wang | 701/100 |
| 6,364,602 B1 | * | 4/2002 | Andrew et al. | 415/1 |

(Continued)

FOREIGN PATENT DOCUMENTS

DE  10 2004 035 575 A1  2/2006

(Continued)

OTHER PUBLICATIONS

A Fully Certified English Translation JP 02-102397A, Published on Apr. 13, 1990.*

(Continued)

*Primary Examiner*—Thai Ba Trieu
(74) *Attorney, Agent, or Firm*—Kenyon & Kenyon LLP

(57) ABSTRACT

An air flow amount passing through a centrifugal compressor is acquired on the basis of outputs of an air flow meter. A surge limit compressor rotation speed is acquired on the basis of the obtained air flow amount passing through the compressor. A current compressor rotation speed (turbo rotation speed) is acquired by a turbo rotation speed sensor. A rotation speed of the compressor is controlled on the basis of the surge limit compressor rotation speed and the current compressor rotation speed. More specifically, while being limited so as to be equal or less than the surge limit compressor rotation speed, a target compressor rotation speed is controlled so as to be a value according to the operating conditions, such as accelerator opening and engine speed, of an internal combustion engine. In addition, the surge of the compressor is judged on the basis of the surge limit compressor rotation speed and the current compressor rotation speed.

11 Claims, 10 Drawing Sheets

U.S. PATENT DOCUMENTS

| | | | |
|---|---|---|---|
| 6,871,498 B1 | 3/2005 | Allen et al. | 60/608 |
| 6,883,324 B2* | 4/2005 | Igarashi et al. | 60/608 |
| 7,043,916 B2* | 5/2006 | Masuda | 60/608 |
| 7,137,253 B2* | 11/2006 | Furman et al. | 60/608 |
| 2007/0095063 A1* | 5/2007 | Mischler et al. | 60/608 |
| 2008/0110169 A1* | 5/2008 | Roh | 60/602 |

FOREIGN PATENT DOCUMENTS

| | | | |
|---|---|---|---|
| EP | 1 336 737 A2 | 8/2003 | |
| JP | 63120821 A * | 5/1988 | |
| JP | 02-102397 A | 4/1990 | |
| JP | 5-42642 U | 6/1993 | |
| JP | 2001-342840 A | 12/2001 | |
| JP | 2003-239755 A | 8/2003 | |
| JP | 2005-330835 A | 12/2005 | |

OTHER PUBLICATIONS

A Fully Certified English Translation JP 2001-342840 A, Published on Dec. 14, 2001.*

* cited by examiner

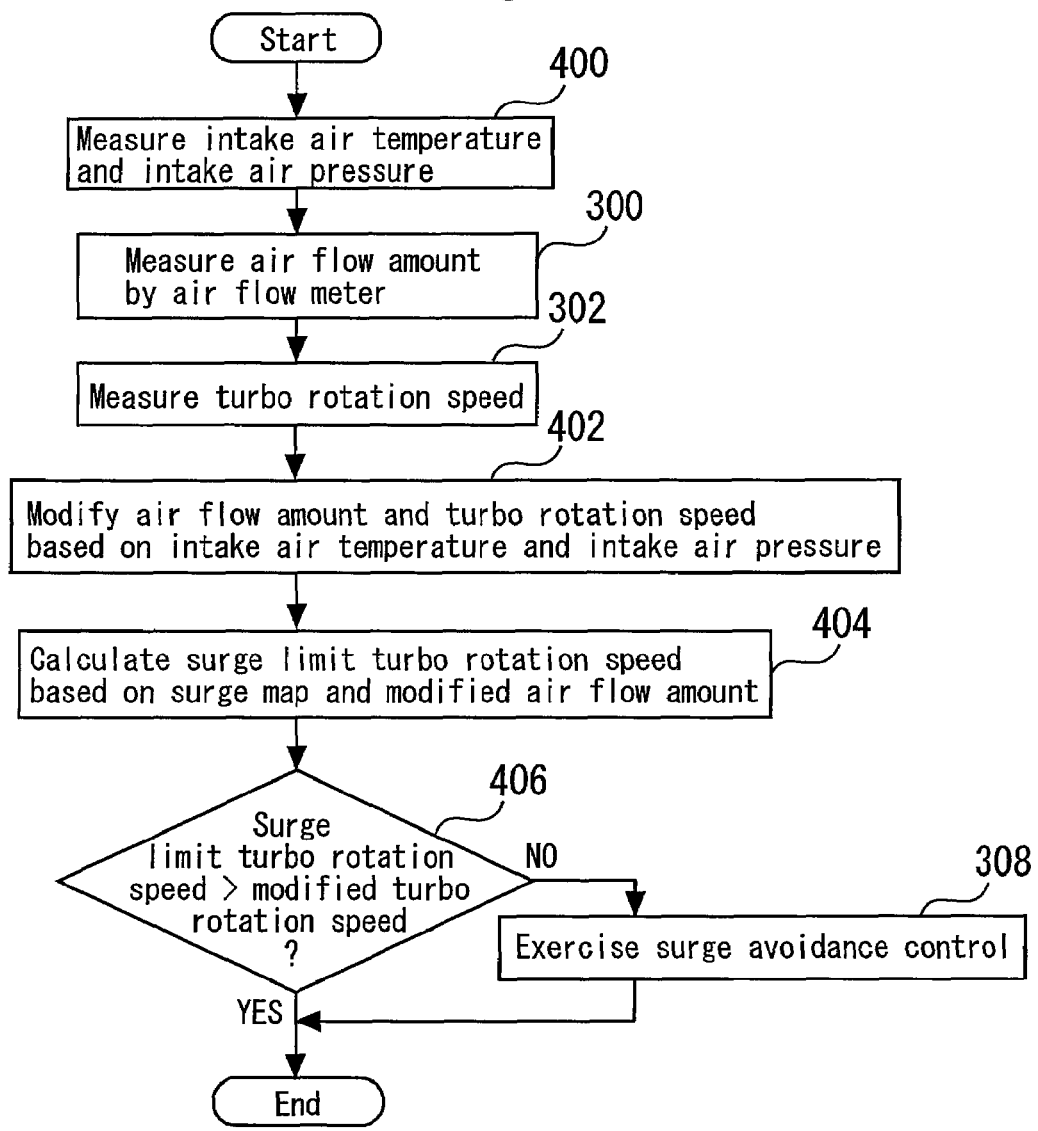
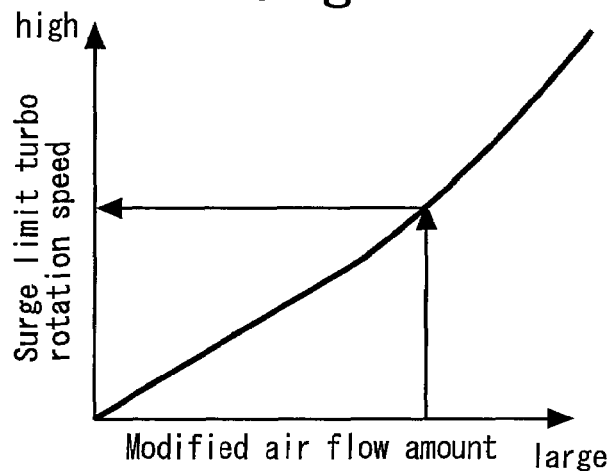

CONTROL APPARATUS FOR INTERNAL COMBUSTION ENGINE WITH SUPERCHARGER

This is a 371 national phase application of PCT/JP2007/065253 filed 03 Aug. 2007, claiming priority to Japanese Patent Applications No. 2006-218810 and No. 2006-218811, both filed 10 Aug. 2006, the contents of which are incorporated herein by reference.

TECHNICAL FIELD

The present invention relates to a control apparatus for an internal combustion engine with a supercharger.

BACKGROUND ART

Patent Document 1, for example, discloses a control apparatus for an internal combustion engine with a turbocharger. The conventional apparatus judges compressor surge of the turbocharger in accordance with the relationship between a pressure ratio of the upstream and downstream pressure of the compressor and an air flow amount passing through the compressor, the relationship between the above pressure ratio and engine speed.

Including the above-mentioned document, the applicant is aware of the following documents as a related art of the present invention.

[Patent Document 1] Japanese Laid-open Patent Application Publication No. 2001-342840

[Patent Document 2] Japanese Laid-open Utility Model Application Publication No. Hei 05-42642

DISCLOSURE OF INVENTION

Problem to be Solved by the Invention

An intake manifold pressure of the internal combustion engine is always fluctuating (pulsating) widely. The method of the above conventional technology using the pressure ratio of the anterior and posterior pressure of the compressor requires substantial time to calculate the pressure ratio exactly because it is affected by such fluctuated intake system. Therefore, it is hard to judge the surge promptly and accurately. On the other hand, it is desirable to control the compressor within an operating region near surge limit to implement an efficient supercharging. However, the above conventional method can be improved in view of controlling the compressor within the operating region near the surge limit while avoiding the surge accurately.

The present invention has been made for solving the above problem, and a first object of the invention is to provide a control apparatus for an internal combustion engine with a supercharger which can control the compressor within the operating region near the surge limit while avoiding the surge accurately.

Further, the above conventional method is hard to exercise the surge judgment promptly and accurately because substantial time is required as described above to calculate the pressure ratio exactly. In addition, the method can not promptly exercise a surge avoidance process thereafter.

The present invention has been made for solving the above problem, and a second object of the invention is to provide a control apparatus for an internal combustion engine with a supercharger which can exercise the surge judgment for the compressor accurately and promptly.

Means for Solving the Problem

A first aspect of the present invention for achieving the above first object is a control apparatus for an internal combustion engine with a supercharger, comprising:

a supercharger having a centrifugal compressor;

rotation speed acquisition means for acquiring compressor rotation speed of the centrifugal compressor;

operating parameter acquisition means for acquiring an operating parameter, which is correlated to an operating characteristic of the centrifugal compressor and whose fluctuation is fewer than that of an intake manifold pressure, for the internal combustion engine;

limit rotation speed acquisition means for acquiring surge limit compressor rotation speed on the basis of the operating parameter; and compressor control means for controlling compressor rotation speed on the basis of the surge limit compressor rotation speed and the compressor rotation speed.

A second aspect of the present invention is the control apparatus for an internal combustion engine with the supercharger according to the first aspect of the present invention, wherein the compressor control means further include target rotation speed acquisition means for acquiring target compressor rotation speed of the centrifugal compressor on the basis of an operating condition of the internal combustion engine, and target rotation speed restriction means for restricting the target compressor rotation speed so as to be equal to or lower than the surge limit compressor rotation speed.

A third aspect of the present invention is the control apparatus for an internal combustion engine with the supercharger according to the first aspect of the present invention, further comprising:

an electric motor for driving the centrifugal compressor;

wherein the compressor control means further include a motor controller that is separate from an engine control device for controlling an operation of the internal combustion engine and that is controlling rotation speed of the electric motor;

wherein the compressor control means equips with the target rotation speed acquisition means and the target rotation speed restriction means in the engine control device; and wherein the motor controller controls the electric motor so that a difference between the target compressor rotation speed provided from the engine control device and current compressor rotation speed may become zero.

A fourth aspect of the present invention is the control apparatus for an internal combustion engine with the supercharger according to any one of the first to the third aspect of the present invention, wherein the operating parameter is an air flow amount passing through the centrifugal compressor.

A fifth aspect of the present invention is the control apparatus for an internal combustion engine with the supercharger according to any one of the first to the third aspect of the present invention, wherein the operating parameter is engine speed.

A sixth aspect of the present invention is the control apparatus for an internal combustion engine with the supercharger according to the fifth aspect of the present invention, wherein the limit rotation speed acquisition means acquires the surge limit compressor rotation speed on the basis of a charging efficiency of the internal combustion engine in addition to the engine speed.

A seventh aspect of the present invention for achieving the above second object is a control apparatus for an internal combustion engine with a supercharger, comprising:

a supercharger having a centrifugal compressor;

rotation speed acquisition means for acquiring compressor rotation speed of the centrifugal compressor;

operating parameter acquisition means for acquiring an operating parameter, which is correlated to an operating characteristic of the centrifugal compressor and whose fluctuation is fewer than that of an intake manifold pressure, for the internal combustion engine;

limit rotation speed acquisition means for acquiring surge limit compressor rotation speed on the basis of the operating parameter; and surge judgment means for judging surge of the centrifugal compressor on the basis of the surge limit compressor rotation speed and the compressor rotation speed.

An eighth aspect of the present invention is the control apparatus for an internal combustion engine with the supercharger according to the seventh aspect of the present invention, further comprising:

surge margin acquisition means for acquiring a surge margin concerning occurrence of the surge of the centrifugal compressor on the basis of the surge limit compressor rotation speed and the operating parameter; and surge avoidance control means for adjusting a control amount of an actuator of the internal combustion engine for avoiding the surge.

A ninth aspect of the present invention is the control apparatus for an internal combustion engine with the supercharger according to the seventh or the eighth aspect of the present invention, wherein the operating parameter is an air flow amount passing through the centrifugal compressor.

A tenth aspect of the present invention is the control apparatus for an internal combustion engine with the supercharger according to the seventh or the eighth aspect of the present invention, wherein the operating parameter is engine speed.

An eleventh aspect of the present invention is the control apparatus for an internal combustion engine with the supercharger according to the tenth aspect of the present invention, wherein the limit rotation speed acquisition means acquires the surge limit compressor rotation speed on the basis of a charging efficiency of the internal combustion engine in addition to the engine speed.

Advantages Of The Invention

According to the first aspect of the present invention, the surge limit compressor rotation speed is acquired accurately and promptly on the basis of the operating parameter whose fluctuation is relatively few. Then, the rotation speed of the compressor is controlled on the basis of the above surge limit compressor rotation speed. Therefore, the present invention makes it possible to control the compressor in a highly-efficient region near the surge limit while avoiding the surge with high accuracy.

According to the second aspect of the present invention, by controlling the target compressor rotation speed so that the target compressor rotation speed may be equal to or lower than the surge limit compressor rotation speed acquired accurately and promptly as mentioned above, it is possible to control the compressor in a highly-efficient region near the surge limit while avoiding the surge with high accuracy.

According to the third aspect of the present invention, complex feedback circuits of the like no longer is necessary to equip separately, if only the target compressor is applied from the engine control device to the electric motor controlled by the motor controller with the control base on the rotation speed. In this way, the present invention can implement the control of supercharging capable of avoiding the surge with high accuracy while simplifying the configuration of the control system of the electric motor.

According to the fourth aspect of the present invention, it is possible to obtain the surge limit compressor rotation speed accurately and promptly on the basis of the air flow amount passing through the compressor.

According to the fifth aspect of the present invention, it is possible to obtain the surge limit compressor rotation speed accurately and promptly on the basis of the engine speed.

According to the sixth aspect of the present invention, in the internal combustion engine with the supercharger that equips with actuators influencing the charging efficiency, it is possible to reflect the change of the charging efficiency due to driving the actuators on the surge limit compressor rotation speed. Therefore, if the internal combustion engine equips with such actuators, the present invention makes it possible to control the compressor in a highly-efficient region near the surge limit while avoiding the surge with higher accuracy compared with the fifth aspect of the present invention.

According to the seventh aspect of the present invention, it is possible to judge the surge accurately and promptly on the basis of the surge limit compressor rotation speed acquired based on the operating parameter whose fluctuation is relatively few, and the compressor rotation speed.

According to the eighth aspect of the present invention, it is possible to avoid entering the surge region more reliably compared with the seventh aspect of the present invention. Further, it is possible to prevent an unnecessary surge avoidance correction amount from being provided in a state where the surge margin is present relatively, thereby avoiding a consumption of a useless engine power.

According to the ninth aspect of the present invention, it is possible to obtain the surge limit compressor rotation speed accurately and promptly on the basis of the air flow amount passing through the compressor.

According to the tenth aspect of the present invention, it is possible to obtain the surge limit compressor rotation speed accurately and promptly on the basis of the engine speed.

According to the eleventh aspect of the present invention, in the internal combustion engine with the supercharger that equips with actuators influencing the charging efficiency, it is possible to reflect the change of the charging efficiency due to driving the actuators on the surge limit compressor rotation speed. Therefore, if the internal combustion engine equips with such actuators, the present invention makes it possible to judge the surge more accurately compared with the tenth aspect of the present invention.

BRIEF DESCRIPTION OF DRAWINGS

FIG. 12 is a flowchart illustrating a routine that is executed in a modified embodiment associated with the fourth embodiment of the present invention.

FIG. 13 is a surge map for acquiring the surge limit turbo rotation speed in accordance with the modified air flow amount.

BEST MODE FOR CARRYING OUT THE INVENTION

First Embodiment

[Description of System Configuration]

Figure 1:
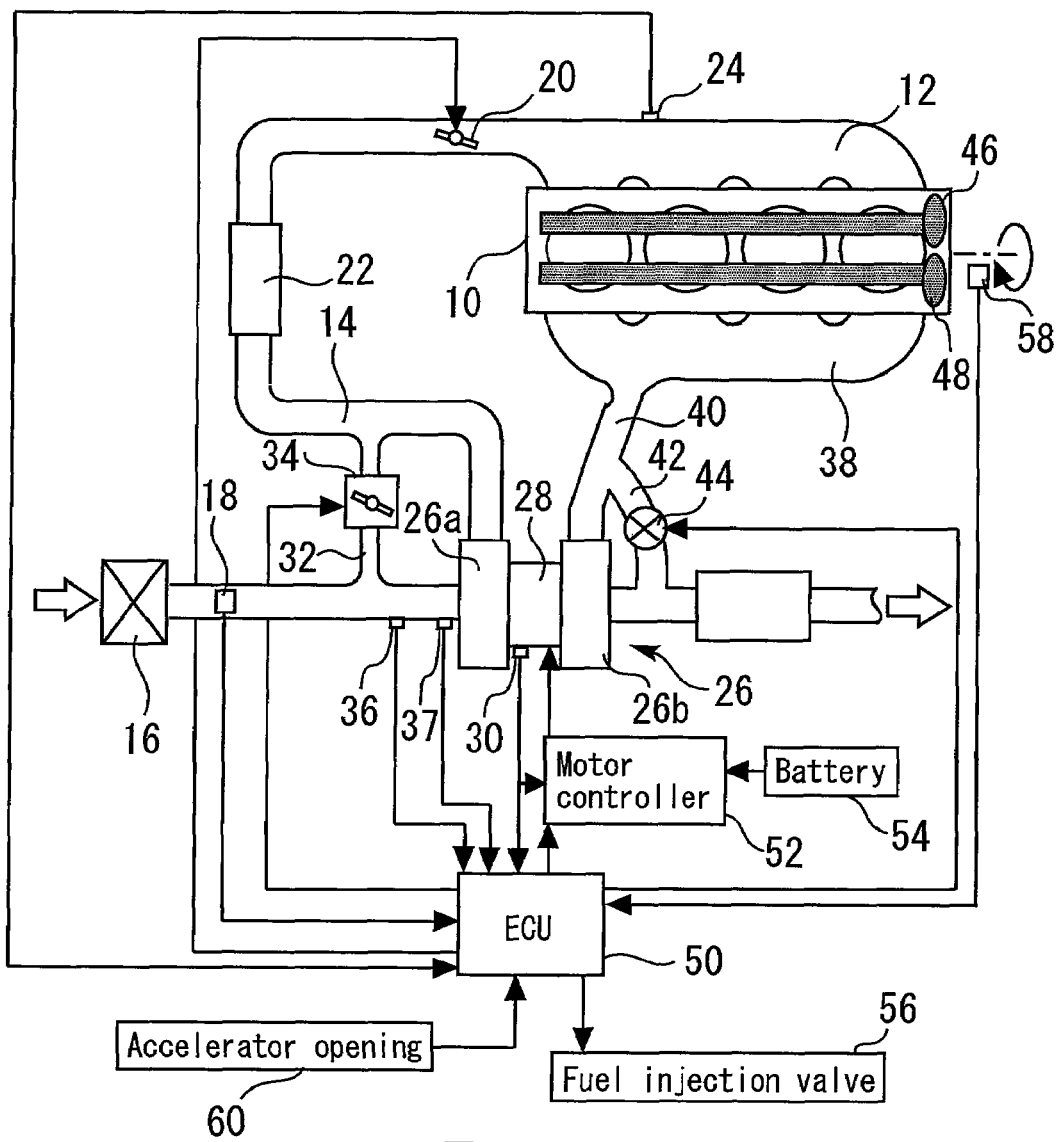
FIG. 1 is a schematic diagram for illustrating a configuration according to a first embodiment of the present invention.

FIG. 1 is a schematic diagram for illustrating a configuration according to a first embodiment of the present invention. As shown in FIG. 1, the system according to the present embodiment includes an internal combustion engine 10. An intake system for the internal combustion engine 10 includes an intake manifold 12 and an intake pipe (intake path) 14 that is connected to the intake manifold 12. Air is taken into the intake pipe 14 from atmospheric air and distributed to a combustion chamber for each cylinder via the intake manifold 12.

The inlet of the intake pipe 14 is provided with an air cleaner 16. An air flow meter 18 is installed downstream of the air cleaner 16 to output a signal representing the flow rate of the air taken into the intake pipe 14. A throttle valve 20 is installed upstream of the intake manifold 12. An intercooler 22 is installed upstream of the throttle valve 20 to cool compressed air. A boost pressure sensor 24 is installed downstream of the intercooler 22 to output a signal representing the pressure within the intake pipe 14.

The middle of the intake pipe 14 between the air flow meter 18 and the throttle valve 20 is provided with an electric-motor-incorporated turbocharger (Mat or motor-assisted turbocharger) 26. The MAT 26 includes a centrifugal compressor 26a, a turbine 26b, and an electric motor 28, which is positioned between the compressor 26a and turbine 26b. It is assumed herein that an alternating current motor is used as the electric motor 28. The compressor 26a is integrally coupled to the turbine 26b via a coupling shaft. The compressor 26a is rotated by the exhaust energy of an exhaust gas that enters the turbine 26b. The coupling shaft doubles as a rotor for the electric motor 28. Therefore, the compressor 26a can be forcibly driven by operating the electric motor 28. Further, a turbo rotation speed sensor 30 is installed over the coupling shaft to output a signal representing the rotation speed (=turbo rotation speed=motor rotation speed) of the compressor 26a. Incidentally, the turbo rotation speed of the MAT 26 is equal to the motor rotation speed of the electric motor 28. Therefore, the compressor rotation speed may be detected on the basis of the current given to the electric motor 28 without turbo rotation speed sensor 30.

One end of an intake bypass pipe 32 is connected to the middle of the intake pipe 14 between the compressor 26a and the intercooler 22. The other end of the intake bypass pipe 32 is connected to the upstream end of the compressor 26a. The middle of the intake bypass pipe 32 is provided with a bypass valve 34 for controlling the flow rate of air that flows in the intake bypass pipe 32. When the bypass valve 34 is operated to open the inlet of the intake bypass pipe 32, part of the air compressed by the compressor 26a returns to the inlet side of the compressor 26a. In an operating state where the turbocharger 26 is likely to surge, such a surge can be avoided by returning part of the air leaving the compressor 26a to the inlet side of the compressor 26a via the intake bypass pipe 32.

An intake pressure sensor 36 is installed upstream of the compressor 26a to output a signal representing the pressure within the intake pipe 14 and an intake temperature sensor 37 is installed upstream of the compressor 26a to output a signal representing the inlet air temperature of the compressor 26a.

The exhaust system for the internal combustion engine 10 includes an exhaust manifold 38 and an exhaust pipe 40, which is connected to the exhaust manifold 38. The exhaust gases discharged from all cylinders of the internal combustion engine 10 are gathered by the exhaust manifold 38 and discharged into the exhaust pipe 40 via the exhaust manifold 38.

An exhaust bypass path 42 is connected to the exhaust pipe 40 to bypass the turbine 26b and to connect the inlet of the turbine 26b and outlet of the turbine 26b. The middle of the exhaust bypass path 42 is provided with an electric waste gate valve 44. The electric waste gate valve 44 is opened and closed on the basis of the boost pressure of the intake air that is detected by the boost pressure sensor 24. Incidentally, the waste gate valve 44 is not limited to the electric power assist type and may alternatively be a pressure-regulated type that uses a difference in pressure.

Further, the system shown in FIG. 1 includes an intake variable valve mechanism 46 and an exhaust variable valve mechanism 48, respectively, for driving the intake valve and exhaust valve for each cylinder. It is assumed that the variable valve mechanisms 46, 48 include the VVT mechanisms for controlling the opening/closing timing of the intake valve and exhaust valve.

The control system for the internal combustion engine 10 includes an ECU (Electronic Control Unit) 50 and a motor controller 52. While the maximum rotation speed of the internal combustion engine 10 is about 6,000 revolutions per minute, the maximum rotation speed of the turbocharger 26 reaches about 200,000 revolutions per minute. As just described, the rotation speed of the turbocharger 26 is very high. Therefore, throughput of the motor controller 52 is required higher than that of other engine controls. For this reason, the motor controller 52 is separate from the engine ECU 50. In compliance with instructions from the ECU 50, the motor controller 52 controls the power supply to the electric motor 28 with the control based on the turbine rotation speed. The electrical power for the electric motor 28 is supplied from a battery 54. The ECU 50 is a controller that provides overall control over the entire system shown in FIG. 1.

The output end of the ECU 50 is connected to a fuel injection valve 56 for supplying fuel into each cylinder as well as the motor controller 52, the throttle valve 20, bypass valve 34, and various other actuators. The input end of the ECU 50 is connected to a crank angle sensor 58 for detecting engine speed NE, an accelerator position sensor 60 for detecting the degree of accelerator opening, and various other sensors as well as the air flow meter 18 and boost pressure sensor 24. The motor controller 52 is also connected to the turbo rotation speed sensor 30. The ECU 50 is further connected to a plurality of devices and sensors other than those enumerated above. However, their descriptions are omitted. The ECU 50 drives various devices in accordance with outputs from various sensors and a predetermined control program.

[Control System of the Electric Motor According to the Present Embodiment]

Figure 2:
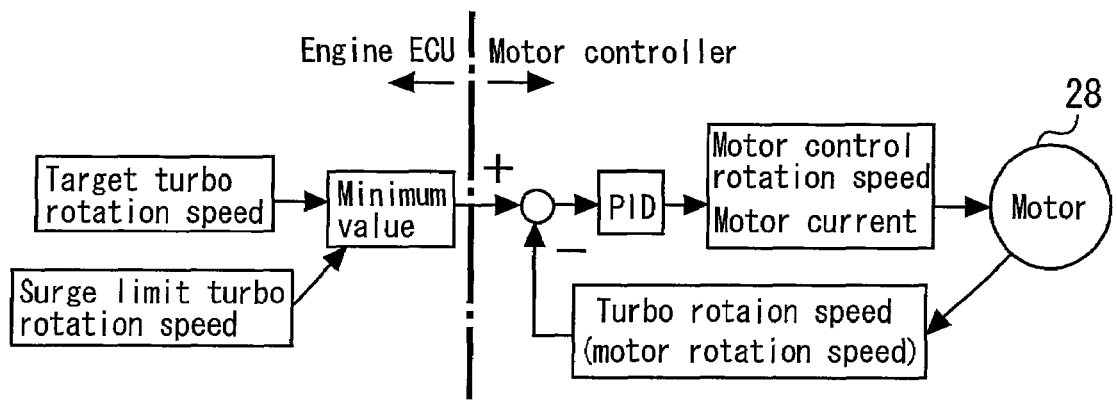
FIG. 2 is a block diagram for illustrating the control system of an electric motor that a turbocharger according to the first embodiment of the present invention equips.

FIG. 2 is a block diagram for illustrating the control system of the electric motor 28 that the MAT 26 equips.

As shown in FIG. 2, the electric motor 28 which is an alternating current motor is driven in accordance with the instructions from the engine ECU 50 and motor controller 52. The engine ECU 50 calculates target turbo rotation speed of the electric motor 28 in accordance with parameters that are operating conditions of the internal combustion engine 10, such as the degree of accelerator opening and the engine speed. Basically, the target turbo rotation speed calculated by such a manner is output at the motor controller 52 by the engine ECU 50. The motor controller 52 calculates motor control rotation speed in such a manner as to reduce the deviation of the current turbo rotation speed detected by the turbo rotation speed sensor 30 from the target turbo rotation speed to zero. Further, the motor controller 52 controls the electrical current supplied to the electric motor 28 so that the motor control rotation speed may be obtained.

In accordance with a surge map described later with reference to FIGS. 3 and 4, the engine ECU 50 according to the present embodiment calculates surge limit turbo rotation speed (surge limit compressor rotation speed) in relationship with an air flow amount passing through the compressor. Then, as shown in FIG. 2, the engine ECU 50 outputs either smaller value of the surge limit turbo rotation speed and target turbo rotation speed at the motor controller 52 as target turbo rotation speed used finally.

According to the relationship between the engine ECU 50 and motor controller 52 described above, the engine ECU 50 calculates the target turbo rotation speed provided to the electric motor 28 and instructs the motor controller 52 about the target turbo rotation speed. Then, the motor controller 52 executes a control for the electrical current provided to the electric motor 28 by a feedback control of the turbo rotation speed with a PID control, on the basis of the target turbo rotation speed (or the surge limit turbo rotation speed) received from the engine ECU 50.

[Control Method of the Electric Motor (Alternating Current Motor) According to the Present Embodiment]

Figure 3:
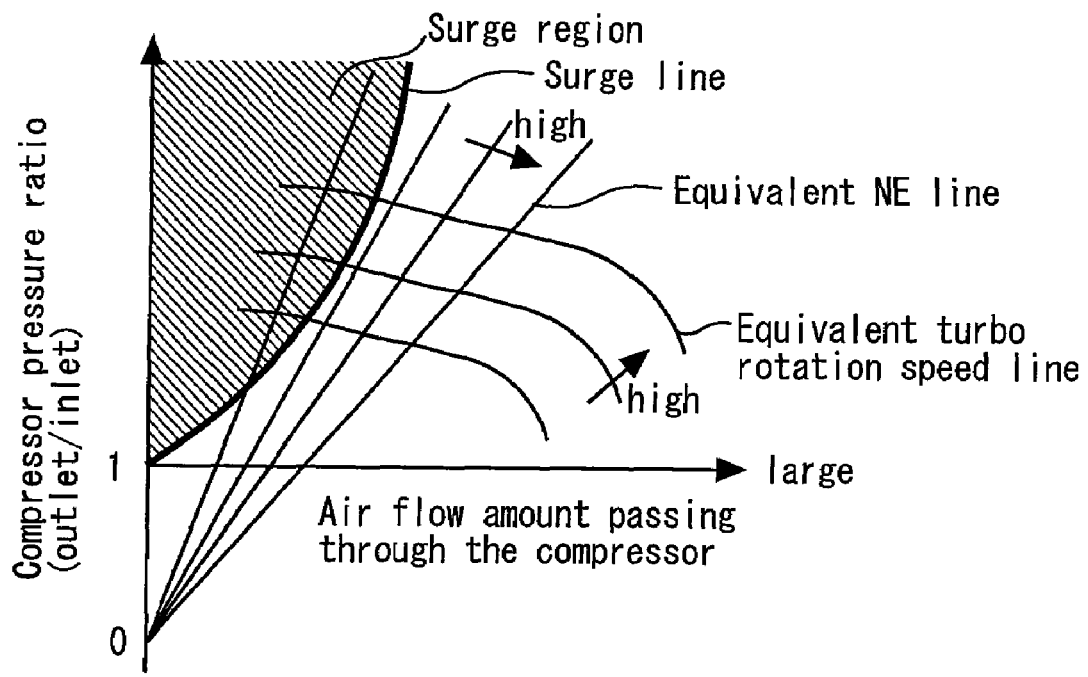
FIG. 3 is a diagram showing the relationship between a pressure ratio of an outlet pressure of the compressor to an inlet pressure thereof and an air flow amount passing through the compressor.

FIG. 3 is a diagram showing the relationship between the pressure ratio of an outlet pressure of the compressor 26a to an inlet pressure thereof and an air flow amount passing through the compressor. A curved line depicted in heavy line in FIG. 3 shows a surge line. A region provided with hatching in FIG. 3 and located on the left side of the surge line corresponds to a surge region. More specifically, the surge is likely to occur in a condition where the pressure ratio of the compressor 26a is high and the air flow amount passing through the compressor is small.

FIG. 3 has an equivalent turbo rotation speed line. As shown in FIG. 3, if the turbo rotation speed is constant, the surge region becomes closer as the air flow amount passing through the compressor becomes smaller. Between the turbo rotation speed and pressure ratio, there is a relationship that the turbo rotation speed becomes higher as the pressure ratio becomes higher. According to the relationship shown in FIG. 3 mentioned above, if the air flow amount passing through the compressor which is one of the operating parameters for the internal combustion engine 10 can be obtained, it is possible to know the surge limit turbo rotation speed, that is, the turbo rotation speed that reaches the surge line.

Figure 4:
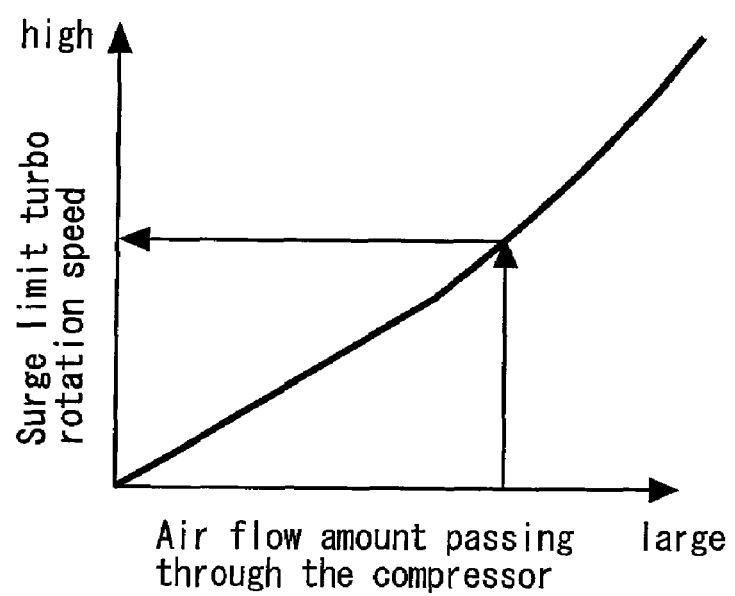
FIG. 4 is a diagram directly showing the relationship between the air flow amount passing through the compressor and surge limit turbo rotation speed.

FIG. 4 is a diagram directly showing the relationship between the air flow amount passing through the compressor and the surge limit turbo rotation speed. As shown in FIG. 4, the surge limit turbo rotation speed has a tendency to become higher as the air flow passing through the compressor becomes larger. The surge limit turbo rotation speed can be obtained by storing the relationship shown in FIG. 4 to the ECU 50 as a surge map and by obtaining the air flow amount passing through the compressor measured by the air flow meter 18.

It is desirable to control the compressor 26a near the surge line to implement an efficient supercharging. The present embodiment controls the electric motor 28 of the MAT 26 in accordance with the surge limit turbo rotation speed calculated based on the surge map shown in FIG. 4 and in accordance with the present turbo rotation speed. More specifically, the present embodiment controls the target turbo rotation speed of the electric motor 28 within a range not to exceed the surge limit turbo rotation speed calculated as mentioned above.

[Details of Process Performed by First Embodiment]

Figure 5:
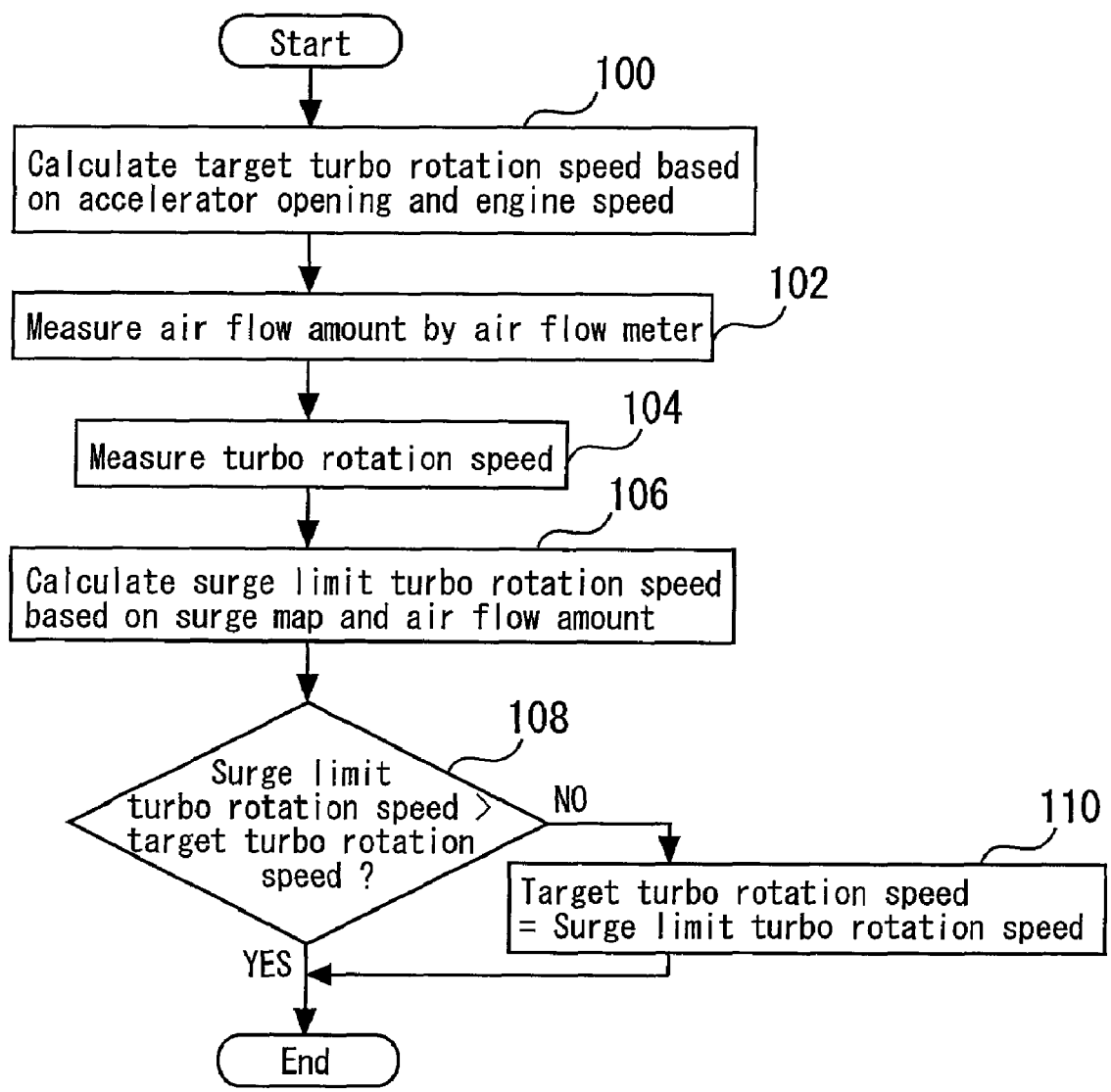
FIG. 5 is a flowchart illustrating a routine that is executed in the first embodiment of the present invention.

FIG. 5 is a flowchart illustrating a routine that the ECU 50 executes to implement the above functionality in accordance with the present first embodiment. In the routine shown in FIG. 5, step 100 is first performed to acquire the current degree of accelerator opening and the current engine speed, respectively, on the basis of the outputs of the accelerator position sensor 60 and crank angle sensor 58. And step 100 is also performed to calculate the target turbo rotation speed of the electric motor 28 in accordance with the acquisition result.

Next, step 102 is performed to measure the air flow amount passing through the compressor using the air flow meter 18. Then, step 104 is performed to measure the turbo rotation speed using the turbo rotation speed sensor 30.

Next, step 106 is performed to calculate the surge limit turbo rotation speed on the basis of the surge map and the air flow amount passing through the compressor acquired in above step 102. The ECU 50 stores such a relationship shown in FIG. 4, as a surge map for acquiring the surge limit turbo rotation speed. Such a surge map is specified by experiments conducted in advance, etc.

Next, step 108 is performed to judge whether the surge limit turbo rotation speed acquired in above step 106 is higher than the target turbo rotation speed calculated in above step 100. If the obtained judgment result indicates that the surge limit turbo rotation speed is higher than the target turbo rotation speed, it can be judged that the target turbo rotation speed at the present moment has not reached the surge limit yet. Therefore, the target turbo rotation speed calculated in above step 100 is used without change.

If, on the other hand, the judgment result obtained in above step 108 indicates that the surge limit turbo rotation speed is not higher than the target turbo rotation speed, to avoid the result that an operating point of the compressor 26a moves to the surge region, step 110 is performed to replace the target turbo rotation speed value calculated in above step 110 with the surge limit turbo rotation speed calculated in above step 106.

According to the routine that has been described above with reference to FIG. 5, the surge limit turbo rotation speed is acquired accurately and promptly in accordance with the air flow amount passing through the compressor. And the target turbo rotation speed of the electric motor 28 is controlled within a range not to exceed the surge limit turbo rotation speed. Then, as described with reference to the block diagram shown in FIG. 2, the motor rotation speed, that is, the turbo rotation speed is controlled by the feedback control of the turbo rotation speed with the present turbo rotation speed so that the target turbo rotation speed may be restricted within a range not to exceed such a surge limit by the motor controller 52. Therefore, the method according to the current embodiment makes it possible to control the compressor 26a in a highly-efficient region near the surge limit while avoiding the surge with high accuracy.

Unlike the method according to the present embodiment as described above, there is a known method for controlling the electric motor 28 based on the boost pressure. More specifically, the engine ECU calculates the surge limit pressure ratio in accordance with the relationship between the air flow amount passing through the compressor and the turbo rotation speed. Then, the ECU calculates the limit boost pressure on the basis of the surge limit pressure ratio. Next, the ECU calculates the target output value of the electric motor in accordance with the difference between the limit boost pressure and the current boost pressure. Next, the ECU outputs the target output value of the motor at the motor controller. The motor controller determines a certain target turbo rotation speed (motor rotation speed) so that the difference between the target output value of the motor and the current output value of the motor may approach zero. Then, according to the above known method, the electrical current for the motor is controlled so that the difference between the target turbo rotation speed and the current turbo rotation speed may approach zero.

When the pressure ratio is used as a parameter as the conventional method described above, the intake manifold pressure of the internal combustion engine is affected by pulsation of the intake system. Therefore, a certain time (several hundreds millisecond) is required to calculate an exact pressure ratio on the basis of such widely fluctuating intake manifold pressure. In this way, when the boost pressure is used, delay in control and variations in measurement become large. Therefore, it is hard to judge the surge promptly and accurately. Consequently, to avoid the surge surely, it is required to operate the supercharger with an enough margin against the surge line. However, if such an enough margin is set, it is impossible to implement the efficient supercharging near the surge line.

Further, if the conventional method as described above is used, a feedback circuit concerning the boost pressure is needed within the engine ECU. In addition, although the alternating current motor is the motor controlled by the rotation speed control, a feedback circuit concerning the motor output in addition to a feedback circuit concerning the turbo rotation speed is needed within the motor controller.

In contrast, in the method according to the present embodiment with the control based on the turbine rotation speed (motor rotation speed), parameters needed to measure in real time are the air flow amount passing through the compressor and the turbo rotation speed. Accurate values can be obtained in a relatively short time because the air flow amount passing through the compressor is measured near the inlet of the intake pipe 14 that does not almost undergo the effect of the pulsation. Further, as described in the processes of above step 108-110, the target turbo rotation speed considered the surge limit is applied to the motor controller 52 controlling the electric motor 28, which is an alternating current motor, with the control based on the rotation speed. Therefore, it is unnecessary to provide with the feedback circuit concerning the boost pressure and motor output as the conventional method described above, within the control system of the electric motor 28. Thus, the method according to the present embodiment can implement the control of supercharging capable of avoiding the surge with high accuracy while simplifying the configuration of the control system of the electric motor 28.

Figure 6:
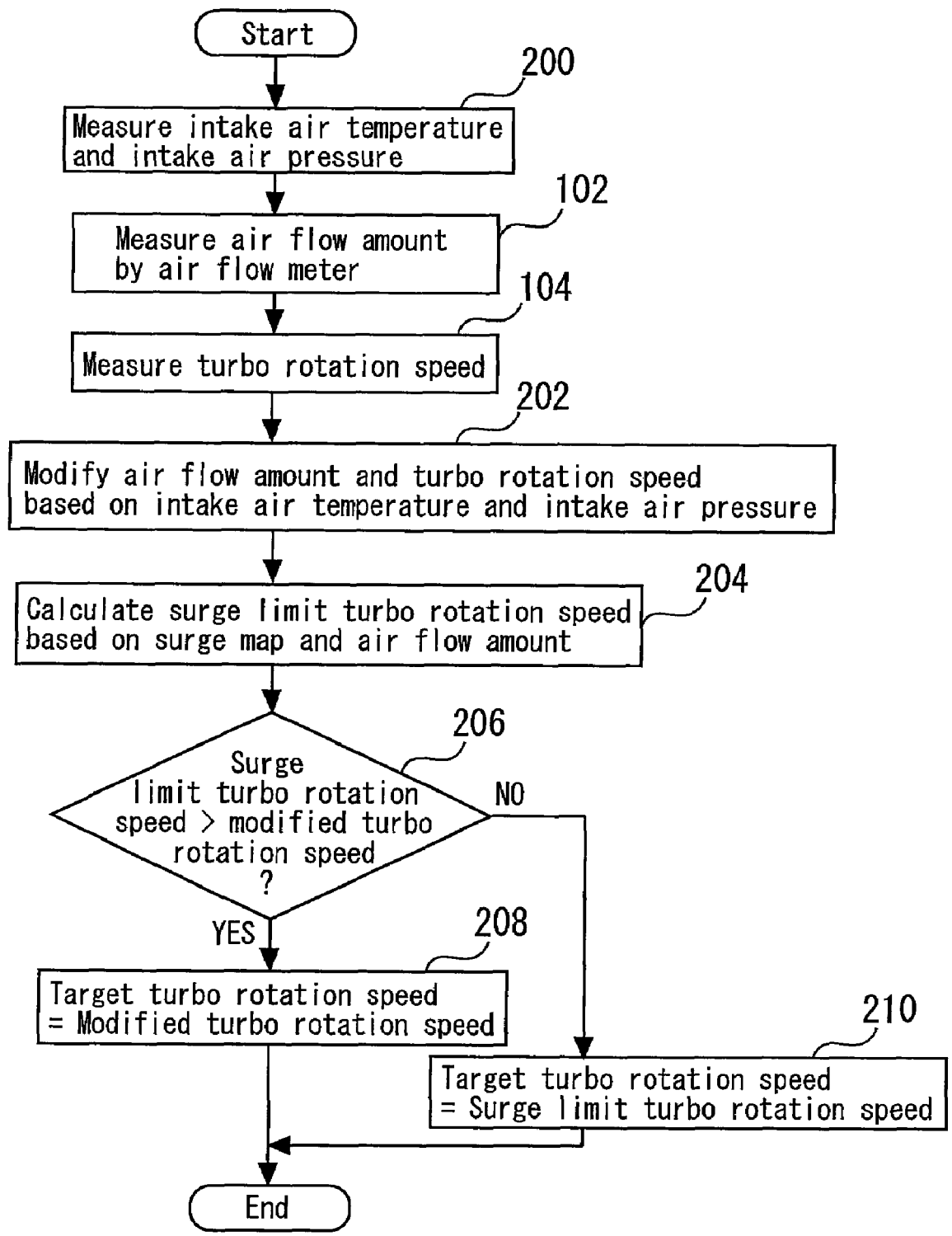
FIG. 6 is a flowchart illustrating a routine that is executed in a modified embodiment associated with first embodiment of the present invention.
Figure 7:
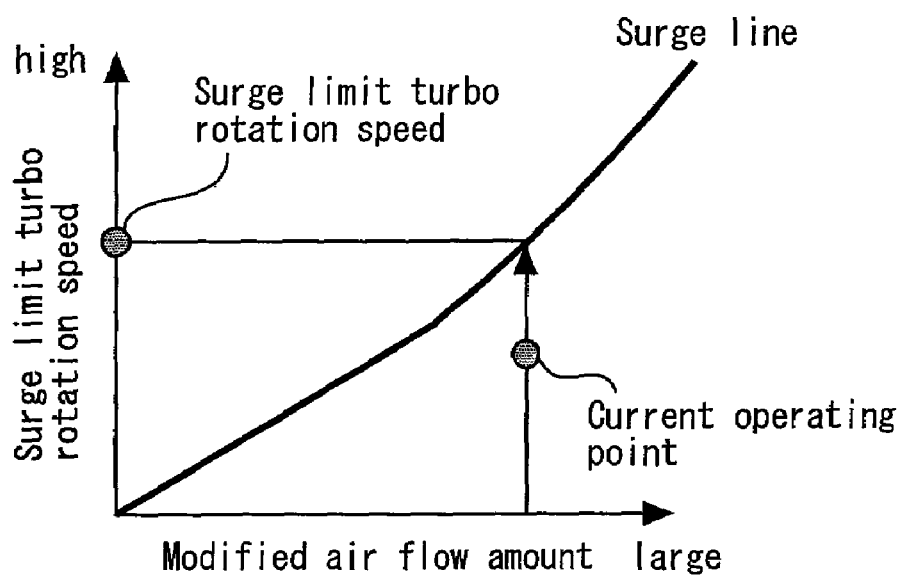
FIG. 7 is a surge map for acquiring the surge limit turbo rotation speed in accordance with a modified air flow amount.

Incidentally, the first embodiment, which has been described above, the air flow amount passing through the compressor measured by the air flow meter 18 and the present turbo rotation speed measured by the turbo rotation speed sensor 30, respectively, is directly used to avoid the surge. However, to avoid the surge more surely, the target turbo rotation speed may be controlled by the following method described with reference to FIGS. 6 and 7, FIG. 6 is a flowchart illustrating a routine that the ECU 50 performs in order to implement a modified embodiment of the control of the target turbo rotation speed described above. As regards the steps in FIG. 6 that are the same as those in FIG. 5, their description is omitted or abridged with the same reference numerals assigned.

In the routine shown in FIG. 6, step 200 is first performed to measure the intake air temperature and the intake air pressure, respectively, on the basis of the outputs of the intake temperature sensor 37 and the intake pressure sensor 36.

Next, the air flow amount passing through the compressor and the turbo rotation speed acquired in above steps 102 and 104 are modified in accordance with the intake air temperature and the intake air pressure, respectively.

Specifically, they are modified in accordance with the following equations.

(modified air flow amount)=(air flow amount passing through the compressor)$\times \sqrt{\theta}/\delta$ (modified turbo rotation speed)=(turbo rotation speed)$/\sqrt{\theta}$ In each equation noted above, $\theta$ is (intake air temperature)/(standard temperature (e.g. 293.15 K)) and $\delta$ is (intake pressure)/(standard pressure (e.g. 101.325 kPa abs (absolute pressure))).

Next, step 204 is performed to calculate the surge limit turbo rotation speed on the basis of a surge map shown in FIG. 7 and the modified air flow amount obtained in step 200 (step 204). FIG. 7 is a surge map that the ECU 50 stores to obtain the surge limit turbo rotation speed in accordance with the modified air flow amount. The map shown in FIG. 7 is similar to the map shown in above mentioned FIG. 4 expect that the air flow amount passing through the compressor is changed to the modified air flow amount.

Next, step 206 is performed to compare the surge limit turbo rotation speed obtained in step 204 and the modified turbo rotation speed obtained in step 202. Accordingly, if the comparison result indicates that the surge limit turbo rotation speed is higher than the modified rotation speed, it can be judged that the current target turbo rotation speed has not reached the surge limit turbo rotation speed yet. Then, in this instance, the modified turbo rotation speed is used as the target turbo rotation speed (step 208).

If, on the other hand, the comparison result in step 206 indicates that the surge limit turbo rotation speed is not higher than the modified turbo rotation speed, the surge limit turbo rotation speed is used as the target turbo rotation speed to avoid that the operating point of the compressor 26a enters the surge region (step 110).

The routine that has been described above with reference to FIG. 6 makes it possible to calculate the surge limit turbo rotation speed more accurately than the method shown in FIG. 5. Therefore, using such surge limit turbo rotation speed makes it possible to control the compressor 26a in a highly-efficient region near the surge limit while avoiding the surge more accurately.

Incidentally, in the first embodiment, which has been described above, the "rotation speed acquisition means" according to the first aspect of the present invention is implemented when the ECU 50 performs step 104; the "operating parameter acquisition means" according to the first aspect of the present invention is implemented when the ECU 50 performs step 102; the "limit rotation speed acquisition means" according to the first aspect of the present invention is implemented when the ECU 50 performs step 106; and the "compressor control means" according to the first aspect of the present invention is implemented when the ECU 50 performs steps 108 and 110.

In addition, in the first embodiment, which has been described above, the "target rotation speed acquisition means" according to the second aspect of the present invention is implemented when the ECU 50 performs step 100; and the "target rotation speed restriction means" according to the second aspect of the present invention is implemented when the ECU 50 performs step 110 in a situation where the judgment in step 108 is not established.

Further, in the first embodiment, which has been described above, the engine ECU 50 corresponds to the "engine control device" according to the third aspect of the present invention; and the motor controller 52 corresponds to the "motor controller" according to the third aspect of the present invention.

Second Embodiment

Next, a second embodiment of the present invention will now be described with reference to FIG. 8.

The system according to the preset embodiment is implemented by adopting the hardware configuration shown in FIG. 1 and by allowing the ECU 50 to execute a routine similar to the routine shown in FIG. 5.

[Features of the Second Embodiment]

Figure 8:
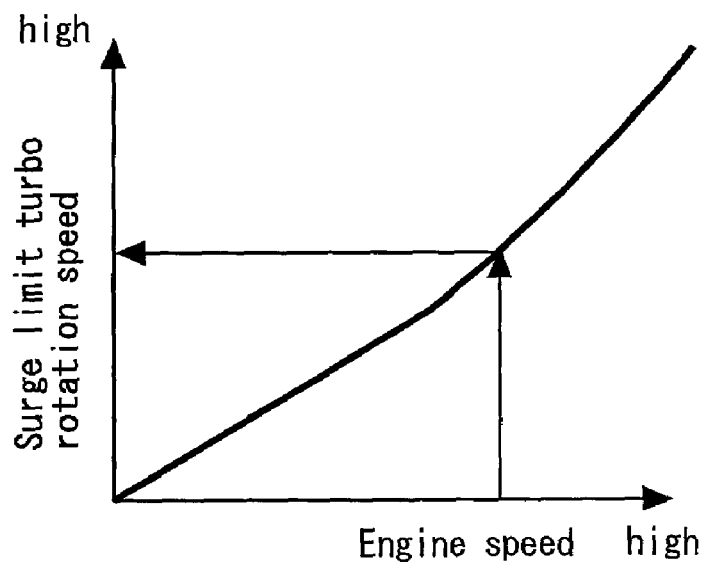
FIG. 8 is a diagram showing a surge map used in a second embodiment and a fifth embodiment of the present invention.

FIG. 8 is a diagram showing a surge map used in the present second embodiment. The first embodiment described above calculates the surge limit turbo rotation speed in accordance with the surge map defined by the relationship with the air flow amount passing through the compressor. However, operating parameters, which can be used for judging the surge and which is correlated to operating characteristics of the compressor 26a and which varies narrower than the intake pipe pressure, for the internal combustion engine 10, is limited to the air flow amount passing through the compressor. For example, engine speed may be used as the operating parameters. That is to say, as shown in FIG. 8, the present embodiment is characterized by the fact that the surge limit turbo rotation speed is calculated in accordance with the surge map determined by the relationship with the engine speed.

There is a correlation that is shown by the surge map in FIG. 3 among the engine speed, the turbo rotation speed and the surge region. Therefore, the turbo rotation speed reaching the surge line, that is, the surge limit turbo rotation speed can be known if the engine speed is obtained in a way similar to the case of the air flow amount passing through the compressor.

Target turbo rotation speed control using the surge map in which the surge limit turbo rotation speed is defined by the relationship with the engine speed is implemented by allowing the ECU 50 to execute a routine similar to the routine in which the air flow amount passing through the compressor according to the routine shown in above FIG. 5 is replaced by the engine speed. Consequently, effects similar to that in the first embodiment described above are obtained.

Third Embodiment

Next, a third embodiment of the present invention will now be described with reference to FIG. 9.

The system according to the preset embodiment is implemented by adopting the hardware configuration shown in FIG. 1 and by allowing the ECU 50 to execute a routine similar to the routine shown in FIG. 5.

[Features of the Third Embodiment]

Figure 9:
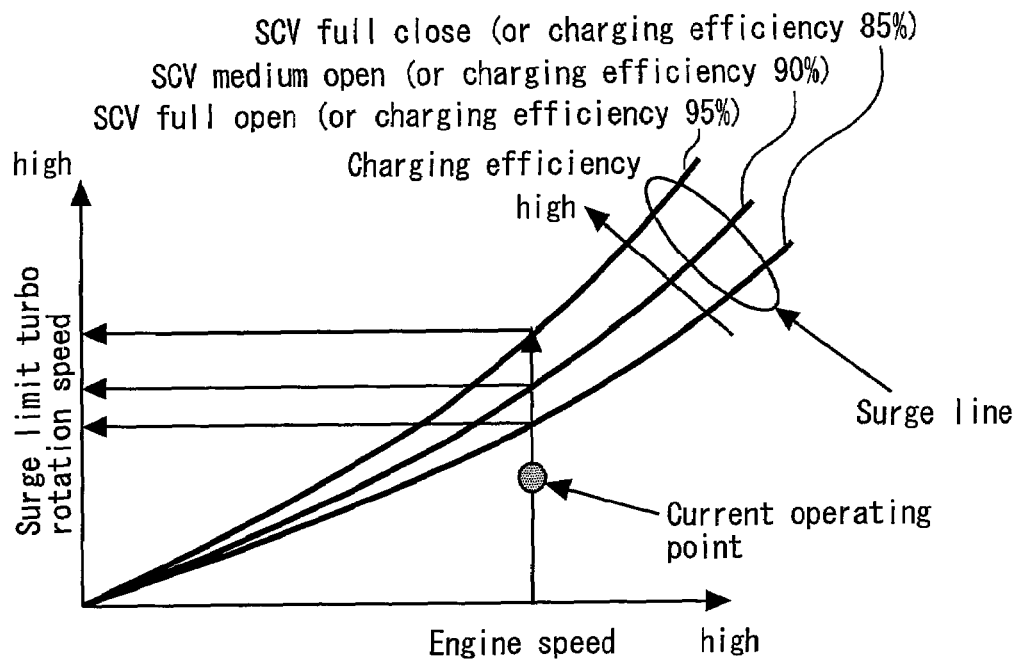
FIG. 9 is a diagram showing a surge map used in a third embodiment and a modified embodiment associated with a fifth embodiment of the present invention.

FIG. 9 is a diagram showing a surge map used in the present third embodiment. The surge map according to the present embodiment is a map that defines the surge limit turbo rotation speed in the relationship with the engine speed as with the case of the second embodiment described above. And now, charging efficiency of the internal combustion engine 10 varies when an opening angle of a swirl control valve or an operating position of the variable valve mechanisms 46, 48, for example, changes. The present embodiment is characterized by the fact that the change of the charging efficiency due to driving actuators equipped with such internal combustion engine 10 is reflected on the surge map.

When the surge map of the present embodiment is conceptually explained, it includes a plurality of surge lines in accordance with a control amount (here, the opening angle of the swirl control valve) of actuators for the internal combustion engine 10. These surge lines are set so that the value of the surge limit turbo rotation speed for a certain engine speed may become large as the opening angle of the swirl control valve becomes large, namely, the charging efficiency becomes high.

According to the surge map of the present embodiment that has been described above, the surge limit turbo rotation speed is calculated on the basis of the opening angle of the swirl control valve in addition to the engine speed. Therefore, it is possible to reflect the change of the charging efficiency due to driving the actuators for the internal combustion engine 10 on the calculation of the surge limit turbo rotation speed. Then, using the surge limit turbo rotation speed calculated in such a manner makes it possible to control the compressor 26a in a highly-efficient region near the surge limit while avoiding the surge more accurately compared with the second embodiment described above.

Incidentally, the third embodiment, which has been described above, calculates the surge limit turbo rotation speed on the basis of the opening angle of the swirl control valve that is an actuator concerning the charging efficiency of the internal combustion engine 10. However, the actuator concerning the charging efficiency of the internal combustion engine 10 may be the variable valve mechanisms 46, 48 for controlling the valve-opening characteristics (such as valve lift amount, operating angle, and valve-opening timing) of the intake and exhaust valves.

Further, as an alternative method considering the charging efficiency, an intake manifold pressure sensor and intake manifold temperature sensor detecting the pressure and temperature, respectively, within the intake manifold 12 of the internal combustion engine 10 may be provided. Then, the charging efficiency may be calculated during an operation of the internal combustion engine 10 in accordance with the following equation and the surge lines within the surge map may be changed in accordance with the calculated charging efficiency.

Charging efficiency (Volumetric efficiency)=(intake air amount/intake air density)/(engine speed× engine displacement)×(standard pressure/intake manifold pressure)×(intake air temperature/standard temperature)

Fourth Embodiment

Next, a fourth embodiment of the present invention will now be described with newly reference to FIGS. 10 to 13 in addition to above FIGS. 3 to 4.

Figure 10:
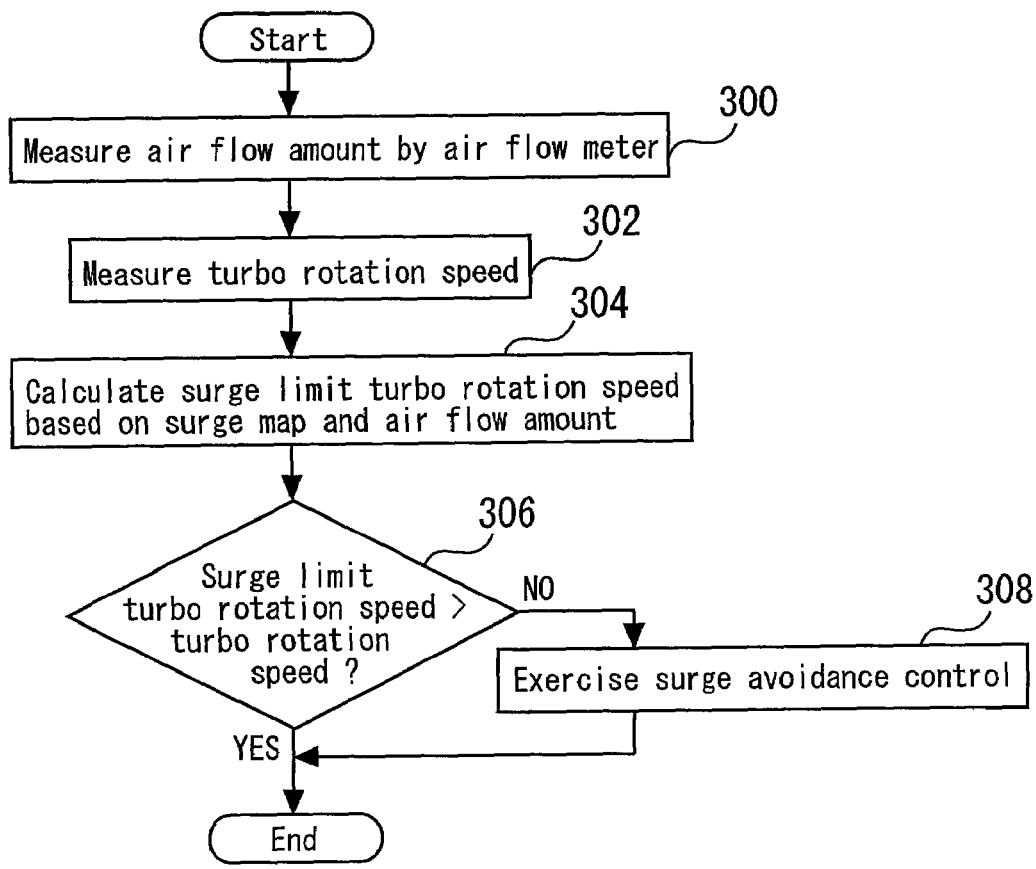
FIG. 10 is a flowchart illustrating a routine that is executed in a fourth embodiment of the present invention.

The system according to the present embodiment is implemented by adopting the hardware configuration shown in FIG. 1 and by allowing the ECU 50 to execute a routine shown in FIG. 10.

[Surge Judgment Method of the Present Embodiment]

Next, a surge judgment method of the present embodiment will be described with reference to above FIG. 3. As described above, the curved line depicted in heavy line in FIG. 3 shows the surge line. The region provided with hatching in FIG. 3 and located on the left side of the surge line corresponds to the surge region. More specifically, the surge is likely to occur in a condition where the pressure ratio of the compressor 26a is high and the air flow amount passing through the compressor is small.

It is desirable to control the compressor 26a near the surge line to implement an efficient supercharging. In addition, if the surge occurred during acceleration, for instance, it is possible to avoid the surge by controlling a predetermined actuator of the internal combustion engine 10, as described below with reference to FIG. 10. However, the generated surge becomes large if detection of the surge delays. When such a large surge occurs, a control amount of the actuator defusing it also becomes large. In addition, if such large surge occurs, it takes substantial time to resolve it. As a result, depression of the accelerating power of the internal combustion engine becomes large. Therefore, surge judgments are required to be accurate and prompt. Then, the present embodiment performs the surge judgments in accordance with the relationship shown in above FIG. 4.

FIG. 3 has the equivalent turbo rotation speed line. As shown in FIG. 3, if the turbo rotation speed is constant, the surge region becomes closer as the air flow amount passing through the compressor becomes smaller. Between the turbo rotation speed and pressure ratio, there is the relationship that the turbo rotation speed becomes higher as the pressure ratio becomes higher. According to the relationship shown in FIG. 3 mentioned above, if the air flow amount passing through the compressor which is one of the operating parameters for the internal-combustion engine 10 can be obtained, it is possible to know the surge limit turbo rotation speed, that is, the turbo rotation speed (surge limit compressor rotation speed) that reaches the surge line.

As described above, FIG. 4 is the diagram directly showing the relationship between the air flow amount passing through the compressor and the surge limit turbo rotation speed. As shown in FIG. 4, the surge limit turbo rotation speed has a tendency to become higher as the air flow passing through the compressor becomes larger. The surge limit turbo rotation speed can be obtained by storing the relationship shown in FIG. 4 to the ECU 50 as a map and by obtaining the air flow amount passing through the compressor measured by the air flow meter 18. Then, by comparing current turbo rotation speed detected by the turbo rotation speed sensor 20 with the above-mentioned surge limit turbo rotation speed, it is possible to judge whether a current operating region of the turbocharger 26 lies within the surge region.

In the surge judgment method mentioned above, the parameters needed to measure in real time are the air flow amount passing through the compressor and the turbo rotation speed. Unlike such judgment method, When the pressure ratio is used as a parameter as the conventional method described above, the intake manifold pressure is affected by the pulsation of the intake system. Therefore, a certain time (several hundreds millisecond) is required to calculate an exact pressure ratio on the basis of such widely fluctuating intake manifold pressure. In contrast, the accurate value can be obtained in a relatively short time because the air flow amount passing through the compressor is measured near the inlet of the intake pipe 14 that does not almost undergo the effect of the pulsation. As described above, by using a surge judgment value (surge limit turbo rotation speed) defined in the relationship with the air flow amount passing through the compressor, the surge judgment method of the present embodiment makes it possible to presume a current operating point of the turbocharger 26 during an operation of the internal combustion engine 10 and to execute the surge judgment accurately and promptly based on the presumption result.

[Surge Avoidance Control of the Present Embodiment]

Next, a surge avoidance control which is exercised after the surge judgment will be described.

In the present embodiment, the ECU 50 calculates the current operating point (in other words, the current operating point within the compressor map shown in above FIG. 3) of the turbocharger 26 on the basis of the air flow amount passing through the compressor and current turbo rotation speed using the relationship shown in above FIG. 4. Then, the ECU 50 controls the predetermined actuators (such as the waste gate valve 44 and the bypass valve 34) of the internal combustion engine 10 so that the operating point may pass along the surge line of the compressor 26a without exceeding the line.

FIG. 10 is a flowchart illustrating a routine that the ECU 50 executes to implement the above functionality in accordance with the present fourth embodiment. In the routine shown in FIG. 10, step 300 is first performed to measure the air flow amount passing through the compressor by the air flow meter 18. Then, step 302 is performed to measure the turbo rotation speed by the turbo rotation speed sensor 30.

Next, step 304 is performed to calculate the surge limit turbo rotation speed on the basis of the surge map and the air flow amount passing through the compressor acquired in above step 300. The ECU 50 stores such a relationship shown in FIG. 4, as a surge map for acquiring the surge limit turbo rotation speed. Such a surge map is specified by experiments conducted in advance, etc.

Next, step 306 is performed to judge whether the surge limit turbo rotation speed acquired in above step 304 is higher than the current turbo rotation speed obtained in above step 302. If the obtained judgment result indicates that the surge limit turbo rotation speed is higher than the current turbo rotation speed, it can be judged that the current operating point of the compressor 26a has not lain within the surge region yet. Therefore, then the current processing cycle immediately terminates.

If, on the other hand, the obtained judgment result indicates that the surge limit turbo rotation speed is not higher than the current turbo rotation speed, it can be judged that the current operating point of the compressor 26a has reached the surge-line. Therefore, in this case, step 308 is performed to exercise the surge avoidance control as described below. Specifically, it is controlled so as to allow the operating angle of the waste gate valve 44 to increase a certain amount. As a result, the rise of the turbo rotation speed is restrained.

According to the routine that has been described above with reference to FIG. 10, the surge limit turbo rotation speed is calculated on the basis of the surge map and the air flow amount passing through the compressor. In addition, the current operating point of the turbocharger 26 is calculated on the basis of the comparison result of the surge limit turbo rotation speed with the current turbo rotation speed. Then, the operating angle of the waste gate valve 44 is controlled so that the operating point may pass along the surge line of the compressor 26a without exceeding the line. Therefore, the surge judgments can be exercised accurately and promptly, and the surge can be avoided promptly if an occurrence of the surge is recognized. As a result, it is possible to control the compressor 26a near the surge line. Thus, an efficient turbocharging can be achieved using the turbocharger 26.

Incidentally, the fourth embodiment, which has been described above, controls the opening angle of the waste gate valve 44 as one example of the surge avoidance control according to above step 308. However, the method used for the surge avoidance control according to above step 308 is not limited to this. More specifically, if, for example, the bypass valve 34 is provided with the intake pipe 14 as the internal combustion engine 10 of the present embodiment, an opening angle of the bypass valve 34 may be controlled to increase a certain amount for avoiding the surge. Exercising such a method makes it possible to separate the operating point of the compressor 26a from the surge line by increasing the air flow amount passing through the compressor.

Alternatively, a fuel injection amount may be controlled to decrease a certain amount for the surge avoidance according to above step 308. Exercising such a method makes it possible to reduce an exhaust energy supplied to the turbine 26b, thereby restraining the rise of the turbo rotation speed.

In addition, if the turbocharger 26 having the electric motor 28 is provided as the present embodiment, an output of the electric motor 28 may be controlled to decrease a certain amount for the surge avoidance according to above step 308. Such a method is also able to decrease the turbo rotation speed.

Further, if an internal combustion engine is provided with a turbocharger (not shown) having a variable nozzle for varying an inlet area of the turbine, an opening angle of the variable nozzle, that is to say, the inlet area of the turbine may be controlled to increase a certain amount. Such a method is also able to decrease the turbo rotation speed.

Figure 11:
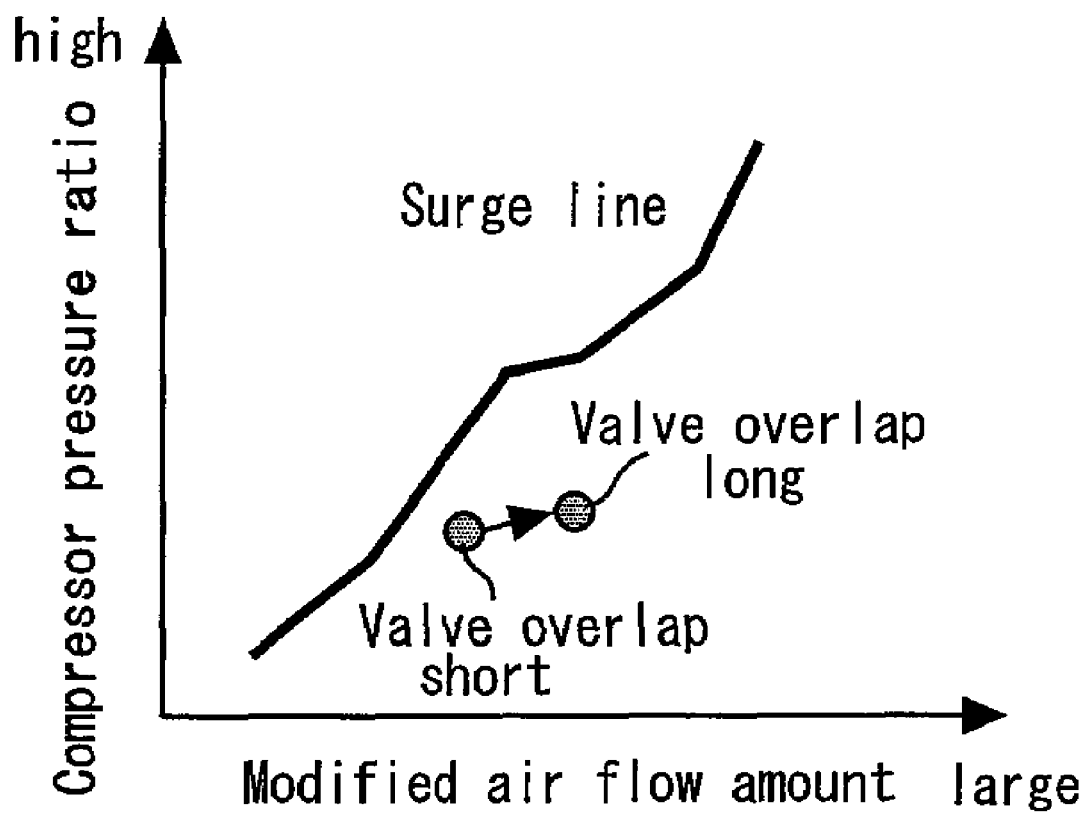
FIG. 11 is a diagram showing a variation of surge margin in the relationship with the valve overlap period.

Further, if the variable valve mechanisms 46, 48 for controlling an open/close timing of an intake and exhaust valves are provided as the present embodiment, an overlap period during which an intake valve opening period overlaps with an exhaust valve opening period may be controlled to increase a certain amount for the surge avoidance according to above step 308. FIG. 11 is a diagram showing a variation of surge margin in the relationship with the valve overlap period. The charging efficiency of the internal combustion engine 10 improves if the valve overlap period is increased appropriately. As a result, as shown in FIG. 11, the air flow amount passing through the compressor is increased and the surge margin is increased due to allowing the operating point of the compressor 26a to get away from the surge line. In addition, a method to improve the charging efficiency for the surge avoidance is limited to this. If, for example, an internal combustion engine (not shown) is provided with the swirl control valve, an opening angle of the swirl control valve may be controlled to increase a certain amount for the surge avoidance.

In addition, to performing the surge judgment, the fourth embodiment, which has been described above, directly uses the air flow amount passing through the compressor measured by the air flow meter 18 and the current turbo rotation speed measured by the turbo rotation speed 30, respectively. However, a method described with reference to FIGS. 12 and 13 hereinafter may be alternatively used to exercise the surge judgment more accurately.

FIG. 12 is a flowchart illustrating a routine that the ECU 50 executes to implement a modified embodiment of the surge avoidance control. As regards the steps in FIG. 12 that are the same as those in FIG. 10, their description is omitted or abridged with the same reference numerals assigned In the routine shown in FIG. 12, step 400 is first performed to measure the intake air temperature and the intake air pressure are first measured, respectively, on the basis of the outputs of the intake temperature sensor 37 and the intake pressure sensor 36.

Next, step 402 is performed to modify the air flow amount passing through the compressor and the turbo rotation speed acquired in above step 300 and 302 in accordance with the intake air temperature and the intake air pressure, respectively, after the air flow amount passing through the compressor and the turbo rotation speed are measured in above step 300 and 302. Specifically they are modified in accordance with the following equations.

(modified air flow amount)=(air flow amount passing through the compressor)$\times \sqrt{\theta}/\delta$ (modified turbo rotation speed)=(turbo rotation speed)/$\sqrt{\theta}$ In each equation noted above, $\theta$ is (intake air temperature)/(standard temperature (e.g. 293.15 K)) and $\delta$ is (intake pressure)/(standard pressure (e.g. 101.325 kPa abs (absolute pressure))).

Next, step 404 is performed to calculate the surge limit turbo rotation speed on the basis of a surge map shown in FIG. 13 and the modified air flow amount obtained in step 402. FIG. 13 is a surge map that the ECU 50 stores to obtain the surge limit turbo rotation speed in accordance with the modified air flow amount. The map shown in FIG. 13 is similar to the map shown in above mentioned FIG. 4 expect that the air flow amount passing through the compressor is changed to the modified air flow amount.

Next, step 406 is performed to compare the surge limit turbo rotation speed obtained in step 404 and the modified turbo rotation speed obtained in step 402. Because the processes after step 406 is the same as those in the routine shown in FIG. 10, their detailed description is omitted.

The routine that has been described above with reference to FIG. 12 can improve calculation accuracy of the surge limit turbo rotation speed and acquisition accuracy of the current turbo rotation speed prefer to the method shown in above FIG. 10, thereby improving precision of the surge judgment more preferably.

Incidentally, in the fourth embodiment, which has been described above, the "rotation speed acquisition means" according to the seventh aspect of the present invention is implemented when the ECU 50 performs step 302; the "operating parameter acquisition means" according to the seventh aspect of the present invention is implemented when the ECU 50 performs step 300; the "limit rotation speed acquisition means" according to the seventh aspect of the present invention is implemented when the ECU 50 performs step 304; and the "surge judgment means" according to the seventh aspect of the present invention is implemented when the ECU 50 performs step 306.

Fifth Embodiment

Next, a fifth embodiment of the present invention will now be described with reference to above FIGS. 8 and 9.

The system according to the present embodiment is implemented by adopting the hardware configuration shown in FIG. 1 and by allowing the ECU 50 to execute a routine similar to the routine shown in FIG. 10.

[Features of the Fifth Embodiment]

The fourth embodiment described above uses a map that defines the surge limit turbo rotation speed in relation to the air flow amount passing through the compressor. However, operating parameter, which can be used for judging the surge and which is correlated to the operating characteristics of the compressor 26a and which varies narrower than the intake pipe pressure, for the internal combustion engine 10, is limited to the air flow amount passing through the compressor, and the engine speed may be alternatively used.

FIG. 8 described above is the diagram showing the surge map also used in the present fifth embodiment. As shown in FIG. 8, the present embodiment is characterized by the fact that the surge limit turbo rotation speed used for the surge judgment is calculated in accordance with the surge map determined by the relationship with the engine speed. There is a certain relation that is shown by the surge map in FIG. 3 among the engine speed, the turbo rotation speed and the surge region. Therefore, the turbo rotation speed reaching the surge line, that is, the surge limit turbo rotation speed (surge limit compressor rotation speed) can be known if the engine speed is obtained in a way similar to the case of the air flow amount passing through the compressor. In addition, the engine speed can be promptly detected based on the outputs of the crank angle sensor 58, and a time for acquiring the engine speed is shorter than that for the pressure ratio. Therefore, it is possible to exercise the surge judgment accurately and promptly. Incidentally, the surge limit turbo rotation speed increase with an increase in the engine speed because the relationship between the surge limit turbo rotation speed and the engine speed is the same as that shown in above FIG. 4.

The surge judgment using the surge map in which the surge limit turbo rotation speed is defined in the relationship with the current engine speed is implemented by allowing the ECU 50 to execute a routine similar to the routine in which the air flow amount passing through the compressor according to the routine shown in above FIG. 10 is replaced by the engine speed. Consequently, effects similar to that in the fourth embodiment described above are obtained.

Incidentally, the fifth embodiment, which has been described above, obtains the surge limit turbo rotation speed on the basis of the relationship with the current engine speed. Here, the charging efficiency of the internal combustion engine 10 varies when an opening angle of a swirl control valve or an operating position of the variable valve mechanisms 46, 48, for example, changes. Then, in an internal combustion engine that has actuators influencing the charging efficiency such as the swirl control valve and the variable valve mechanisms 46, 48, the surge limit turbo rotation speed (surge limit compressor rotation speed) may be defined on the basis of the charging efficiency in addition to the engine speed as the surge map shown in FIG. 9 described above.

FIG. 9 described above is the diagram showing the surge map used in such modified fifth embodiment. The change of the charging efficiency due to the change of the control amount (here, the opening angle of the swirl control valve) of the actuators for the internal combustion engine 10 is reflected on the surge map shown in FIG. 9. When this surge map is conceptually explained, it includes a plurality of surge lines in accordance with the opening angle of the swirl control valve. These surge lines are set so that the value of the surge limit turbo rotation speed for a certain engine speed may become large as the opening angle of the swirl control valve becomes large, namely, the charging efficiency becomes high.

According to the surge map described above, the surge limit turbo rotation speed is calculated on the basis of the opening angle of the swirl control valve in addition to the engine speed. Therefore, it is possible to reflect the change of the charging efficiency due to driving the actuators for the internal combustion engine 10 on the calculation of the surge limit turbo rotation speed. Then, using the surge limit turbo rotation speed calculated in such a manner makes it possible to control the compressor 26a in a highly-efficient region near the surge limit while avoiding the surge more accurately compared with the fifth embodiment described above.

In addition, the surge map shown in FIG. 9 described above calculates the surge limit turbo rotation speed on the basis of the opening angle of the swirl control valve that is an actuator concerning the charging efficiency of the internal combustion engine 10. However, the actuator concerning the charging efficiency of the internal combustion engine 10 may be the variable valve mechanisms 46, 48 for controlling the valve-opening characteristics (such as valve lift amount, operating angle, and valve-opening timing) of the intake and exhaust valves.

Further, as an alternative method considering the charging efficiency, an intake manifold pressure sensor and intake manifold temperature sensor detecting the pressure and temperature, respectively, within the intake manifold 12 of the internal combustion engine 10 may be provided. Then, the charging efficiency may be calculated during an operation of the internal combustion engine 10 in accordance with the following equation and the surge lines within the surge map may be changed in accordance with the calculated charging efficiency.

Charging efficiency (Volumetric efficiency)=(intake air amount/intake air density)/(engine speed×engine displacement)×(standard pressure/intake manifold pressure)×(intake air temperature/standard temperature)

Sixth Embodiment

Next, a sixth embodiment of the present invention will now be described with reference to FIGS. 14 to 16.

The system according to the present embodiment is implemented by adopting the hardware configuration shown in FIG. 1 and by allowing the ECU 50 to execute a below-mentioned routine shown in FIG. 14 instead of the routine shown in FIG. 10.

[Features of the Sixth Embodiment]

The fourth embodiment described above promptly exercises the surge avoidance control when it is judged that the current turbo rotation speed is reached to the surge limit turbo rotation speed. In contrast, the present embodiment is characterized by the fact that the surge margin is judged on the basis of a difference between the surge limit turbo rotation speed and the current turbo rotation speed and that a control amount for a predetermined actuator for avoiding the surge is controlled on the basis of such surge margin.

Figure 14:
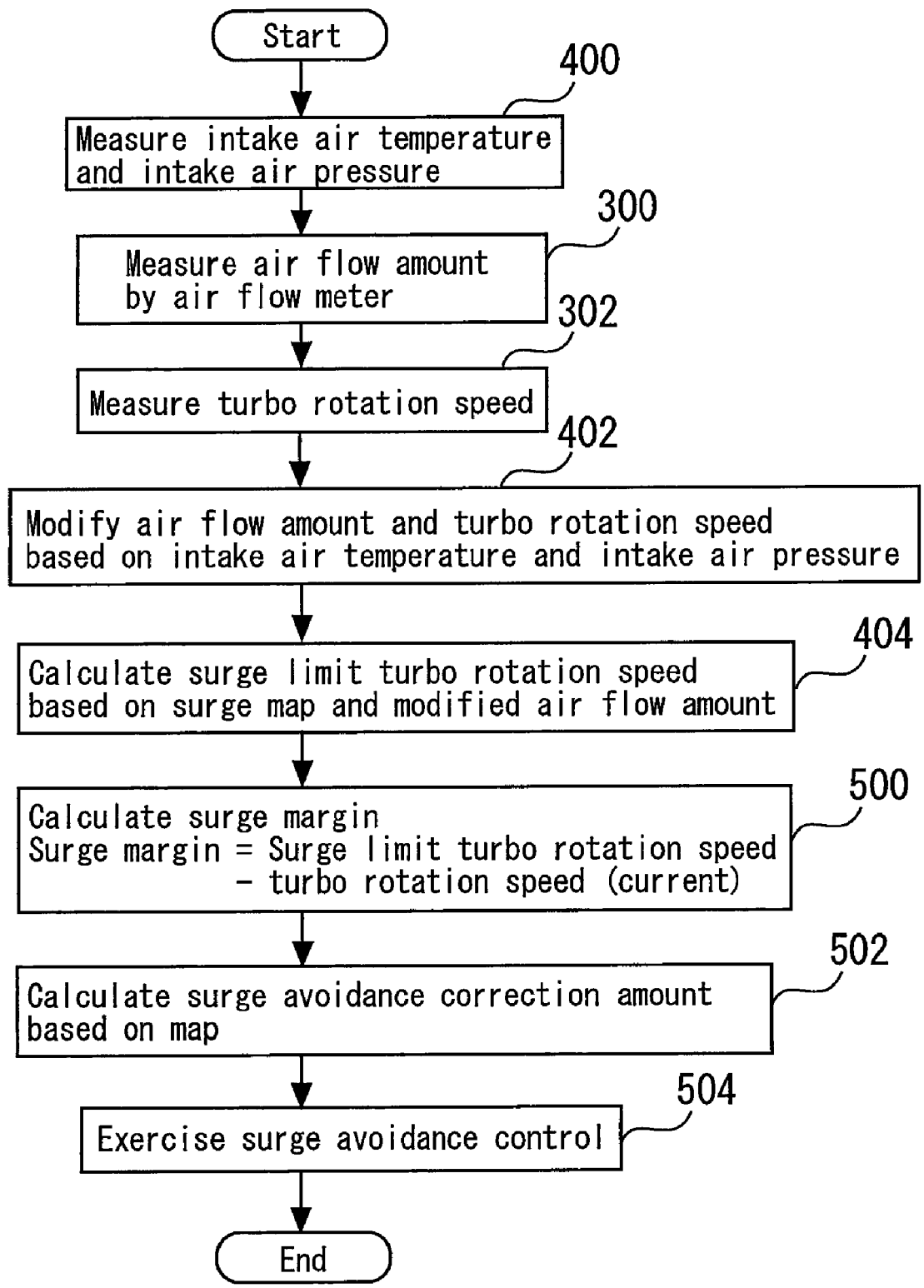
FIG. 14 is a flowchart illustrating a routine that is executed in a sixth embodiment of the present invention.
Figure 15:
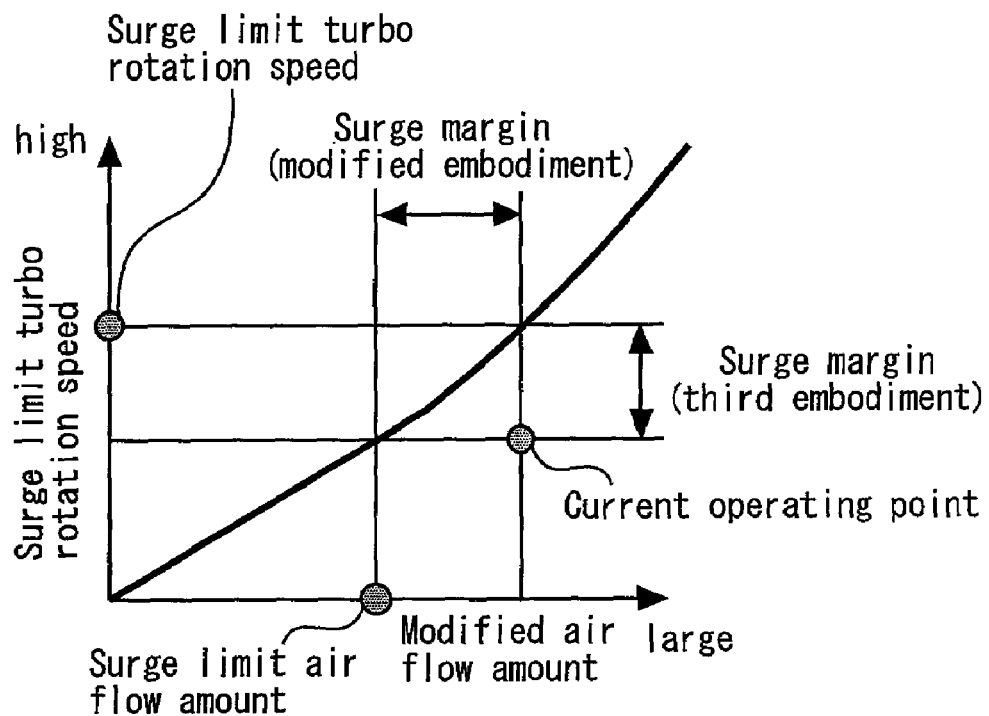
FIG. 15 is a diagram for illustrating the surge margin.

FIG. 14 is a flowchart illustrating a routine that the ECU 50 executes to implement the above functionality in accordance with the present sixth embodiment. As regards the steps in FIG. 14 that are the same as those in FIG. 12, their description is omitted or abridged with the same reference numerals assigned.

In the routine shown in FIG. 14, step 500 is performed to calculate the surge margin after the surge limit turbo rotation speed is calculated in above step 404 on the basis of the surge map shown in above FIG. 13 and the modified air flow amount obtained in above step 402. FIG. 15 is a diagram for illustrating such surge margin. As shown in FIG. 15, the current operating point of the compressor 26a is obtained based on the current modified air flow amount and the turbo rotation speed. Then, the surge margin is calculated as a difference between the surge limit turbo rotation speed at the current modified air flow amount and the current turbo rotation speed.

Figure 16:
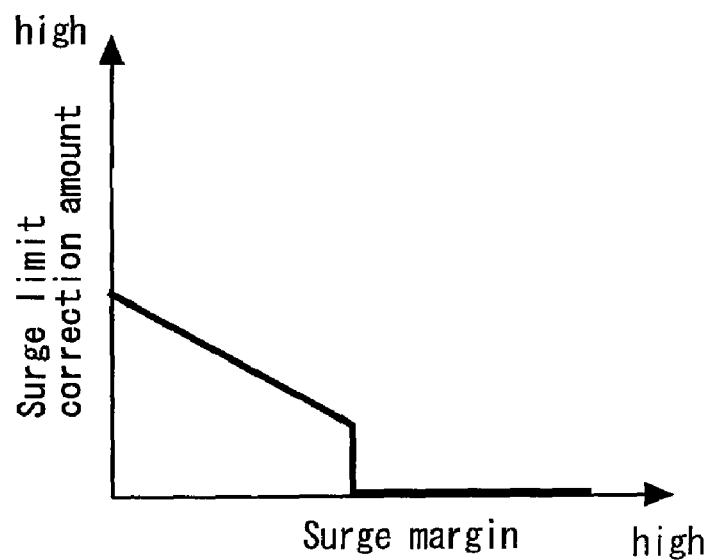
FIG. 16 is a map that defines a relationship between a surge avoidance correction amount and the surge margin.

Next, step 502 is performed to calculate a surge avoidance correction amount on the basis of the surge margin calculated by above step 500 and the surge correction map shown in FIG. 16. This surge avoidance correction amount means a control amount for an actuator to avoid the surge. For example, if the actuator is the waste gate valve 44, a correction amount so as to increase its opening angle corresponds to the correction amount. FIG. 16 is a map that defines the relationship between the surge avoidance correction amount and the surge margin. The map shown in FIG. 16 is set so that the surge avoidance correction amount may be started to be affected if the surge margin becomes less than a certain value and so that the surge avoidance correction amount may become large with a decrease in the surge margin.

Next, in the routine shown in FIG. 14, step 504 is performed to exercise the surge avoidance control by adjusting the opening angle of the waste gate valve 44 in accordance with the surge avoidance correction amount calculated in above step 502.

Incidentally, as described in the fourth embodiment, the actuators used for avoiding the surge are limited to the waste gate valve 44. More specifically, if the surge margin has become small, an opening angle of the bypass valve 34 may be controlled to increase, an output of the electric motor 28 may be controlled to decrease, a fuel injection amount may be controlled to decrease, an opening angle of the variable nozzle may be controlled to increase, an valve overlap period may be controlled to increase, or an opening angle of the swirl control valve may be controlled to increase.

According to the routine that has been described above with reference to FIG. 14, the surge avoidance correction amount provided to the actuator is increased, as the surge margin becomes small, namely, the operating point of the compressor 26a comes close to the surge line. According to such a method, it is possible to avoid entering the surge region more reliably compared with the method in the fourth embodiment described above. Further, it is possible to prevent an unnecessary surge avoidance correction amount from being provided in a state where the surge margin is present relatively, thereby avoiding a consumption of a useless engine power.

Incidentally, the sixth embodiment, which has been described above, in above step 500, calculates the surge margin on the basis of the difference between the surge limit turbo rotation speed calculated based on the current air flow amount passing through the compressor and the current turbo rotation speed. However, the method for calculating the surge margin is not limited to this. More specifically, the surge margin may be calculated on the basis of the difference between the current air flow amount passing through the compressor and surge limit air flow amount calculated based on the current turbo rotation speed (see FIG. 15).

In addition, the sixth embodiment, which has been described above, uses the map (see FIG. 13 (FIG. 15)) that defines the relationship between the surge limit turbo rotation speed and the air flow amount (modified air flow amount) passing through the compressor. However, the operating parameters for the internal combustion engine 10 used for obtaining the surge limit turbo rotation speed are limited to the air flow amount passing through the compressor. For example, the engine speed may be alternatively used as with the case of the fourth embodiment described above. Then, the method for calculating the surge margin may be implemented on the basis of the difference between the surge limit turbo rotation speed calculated based on the current engine speed and the current turbo rotation speed, or may be implemented on the basis of the difference between the current engine speed and the surge limit engine speed calculated based on the current turbo rotation speed.

Incidentally, which has been described above, the "surge margin acquisition means" according to the eighth aspect of the present invention is implemented when the ECU 50 performs step 500; and the "surge avoidance control means" according to the eighth aspect of the present invention is implemented when the ECU 50 performs steps 502 and 504.

Incidentally, the first to sixth embodiments, which has been described above, use the turbocharger 26 having the electric motor 28 capable of forcibly driving the compressor 26a. As far as a centrifugal compressor is equipped, a supercharger according to the present invention is limited to this. An electric compressor, for example, may be used as the supercharger.

The invention claimed is:

1. A control apparatus for an internal combustion engine with a supercharger, comprising:
   a supercharger having a centrifugal compressor;
   rotation speed acquisition means for acquiring compressor rotation speed of the centrifugal compressor;
   first operating parameter acquisition means for acquiring a first operating parameter for the internal combustion engine, wherein the first operating parameter correlates to an operating characteristic of the centrifugal compressor, a fluctuation of which is less than that of an intake manifold pressure;
   base limit rotation speed acquisition means for acquiring surge limit compressor rotation speed on the basis of the first operating parameter;
   second operating parameter acquisition means for acquiring a second operating parameter for the internal combustion engine, wherein the second operating parameter affects an air flow amount passing through the centrifugal compressor, and wherein the second operating parameter is different from the first operating parameter;
   corrected limit rotation speed acquisition means for acquiring corrected surge compressor limit rotation speed by correcting the base surge limit compressor rotation speed in accordance with the second operating parameter; and compressor control means for controlling compressor rotation speed on the basis of the corrected surge limit compressor rotation speed and the compressor rotation speed.

2. The control apparatus for an internal combustion engine with the supercharger according to claim 1, wherein the compressor control means further include target rotation speed acquisition means for acquiring target compressor rotation speed of the centrifugal compressor on the basis of an operating condition of the internal combustion engine, and target rotation speed restriction means for restricting the target compressor rotation speed so as to be equal to or lower than the surge limit compressor rotation speed.

3. The control apparatus for an internal combustion engine with the supercharger according to claim 2, further comprising:

an electric motor for driving the centrifugal compressor;

wherein the compressor control means further include a motor controller that is separate from an engine control device for controlling an operation of the internal combustion engine, wherein the motor controller controls the rotation speed of the electric motor;

wherein the compressor control means are equipped with the target rotation speed acquisition means and the target rotation speed restriction means in the engine control device; and wherein the motor controller controls the electric motor so that the current compressor rotation speed approaches the target compressor rotation speed provided by the engine control device.

4. The control apparatus for an internal combustion engine with the supercharger according to claim 1, wherein the first operating parameter is engine speed.

5. The control apparatus for an internal combustion engine with the supercharger according to claim 4, wherein the corrected limit rotation speed acquisition means acquires the corrected surge limit compressor rotation speed on the basis of a charging efficiency, which is the second operating parameter, of the internal combustion engine in addition to the engine speed.

6. A control apparatus for an internal combustion engine with a supercharger, comprising:

a supercharger having a centrifugal compressor;

rotation speed acquisition means for acquiring compressor rotation speed of the centrifugal compressor;

first operating parameter acquisition means for acquiring a first operating parameter for the internal combustion engine, wherein the first operating parameter correlates to an operating characteristic of the centrifugal compressor, a fluctuation of which is less than that of an intake manifold pressure;

base limit rotation speed acquisition means for acquiring base surge limit compressor rotation speed on the basis of the first operating parameter;

second operating parameter acquisition means for acquiring a second operating parameter for the internal combustion engine, wherein the second operating parameter affects an air flow amount passing through the centrifugal compressor, and wherein the second operating parameter is different from the first operating parameter;

corrected limit rotation speed acquisition means for acquiring corrected surge compressor limit rotation speed by correcting the base surge limit compressor rotation speed in accordance with the second operating parameter; and surge judgment means for judging surge of the centrifugal compressor on the basis of the corrected surge limit compressor rotation speed and the compressor rotation speed.

7. The control apparatus for an internal combustion engine with the supercharger according to claim 6, further comprising:

surge margin acquisition means for acquiring a surge margin concerning occurrence of the surge of the centrifugal compressor on the basis of the base surge limit compressor rotation speed and the first operating parameter; and surge avoidance control means for adjusting a control amount of an actuator of the internal combustion engine for avoiding the surge.

8. The control apparatus for an internal combustion engine with the supercharger according to claim 6, wherein the first operating parameter is engine speed.

9. The control apparatus for an internal combustion engine with the supercharger according to claim 8, wherein the corrected limit rotation speed acquisition means acquires the corrected surge limit compressor rotation speed on the basis of a charging efficiency, which is the second operating parameter, of the internal combustion engine in addition to the engine speed.

10. A control apparatus for an internal combustion engine with a supercharger, comprising:

a supercharger having a centrifugal compressor;

a rotation speed acquisition device to acquire compressor rotation speed of the centrifugal compressor;

a first operating parameter acquisition device to acquire a first operating parameter for the internal combustion engine, wherein the first operating parameter correlates to an operating characteristic of the centrifugal compressor, a fluctuation of which is less than that of an intake manifold pressure;

a base limit rotation speed acquisition device to acquire base surge limit compressor rotation speed on the basis of the first operating parameter;

a second operating parameter acquisition device for acquiring a second operating parameter for the internal combustion engine, wherein the second operating parameter affects an air flow amount passing through the centrifugal compressor, and wherein the second operating parameter is different from the first operating parameter;

a corrected limit rotation speed acquisition device for acquiring corrected surge compressor limit rotation speed by correcting the base surge limit compressor rotation speed in accordance with the second operating parameter; and a compressor control device for controlling compressor rotation speed on the basis of the corrected surge limit compressor rotation speed and the compressor rotation speed.

11. A control apparatus for an internal combustion engine with a supercharger, comprising:

a supercharger having a centrifugal compressor;

a rotation speed acquisition device for acquiring compressor rotation speed of the centrifugal compressor;

a first operating parameter acquisition device for acquiring a first operating parameter for the internal combustion engine, wherein the first operating parameter correlates to an operating characteristic of the centrifugal compressor, a fluctuation of which is less than that of an intake manifold pressure;

a base limit rotation speed acquisition device for acquiring base surge limit compressor rotation speed on the basis of the first operating parameter;

a second operating parameter acquisition device for acquiring a second operating parameter for the internal combustion engine, wherein the second operating parameter affects an air flow amount passing through the centrifugal compressor and is different from the first operating parameter;

a corrected limit rotation speed acquisition device for acquiring corrected surge compressor limit rotation speed by correcting the base surge limit compressor rotation speed in accordance with the second operating parameter; and a surge judgment device for judging surge of the centrifugal compressor on the basis of the corrected surge limit compressor rotation speed and the compressor rotation speed.

* * * * *